United States Patent [19]

Fiorino et al.

[11] 3,909,630

[45] Sept. 30, 1975

[54] HIGH-RATE INTEGRATION, SQUELCH AND PHASE MEASUREMENTS

[75] Inventors: Benjamin C. Fiorino, San Jose, Calif.; Peter T. Marino, Boulder, Colo.

[73] Assignee: International Business Machines Corporation, Armonk, N.Y.

[22] Filed: Jan. 23, 1974

[21] Appl. No.: 435,803

[52] U.S. Cl. .................. 307/229; 307/232; 328/127

[51] Int. Cl.$^2$ .................. H03K 17/00

[58] Field of Search .......... 307/232, 229, 133, 137; 328/127, 120; 235/183; 360/40

[56] References Cited

UNITED STATES PATENTS

| | | | |
|---|---|---|---|
| 3,484,704 | 12/1969 | Heigerford | 328/137 |
| 3,548,327 | 12/1970 | Vermeulen | 307/232 |
| 3,818,501 | 6/1974 | Fiorino | 360/40 |

*Primary Examiner*—Michael J. Lynch
*Assistant Examiner*—B. P. Davis
*Attorney, Agent, or Firm*—Herbert F. Somermeyer

[57] ABSTRACT

An H-configured integration circuit includes a pair of squelch transistors forming two legs of the H with a pair of integrating switch transistors forming the other two legs. A pair of capacitors having a common terminal to a reference potential form the crossbar in the H. Rapid integration and differentially balanced squelching is provided for both capacitors. A phase shift measuring circuit shares the squelch reference with the integration circuit such that any variation in the reference on the integrator also adjusts the phase shift measuring circuit. Such circuit differentially compares the integrated values from the integrators with a reference derived from the squelch for indicating phase shift of the input integrated signal with respect to a timing reference.

22 Claims, 3 Drawing Figures

HIGH-RATE INTEGRATION, SQUELCH AND PHASE MEASUREMENTS

RELATED PATENTS AND APPLICATIONS

This application is an improvement over copending, commonly assigned application, Ser. No. 353,823, filed Apr. 23, 1973 now U.S. Pat. 3,818,501.

Thompson U.S. Pat. No. 3,217,183 and Vermeulen U.S. Pat. 3,548,327 disclose integration data bit detection apparatus.

BACKGROUND OF THE INVENTION

The present invention relates to detecting data from signals represented in diverse waveforms, particularly those waveforms associatable with magnetic recording and communication systems.

Detection of data represented by multidistinct state signals, by using integration techniques, provides noise immunity advantages, as well as sensitivity enhancement over detection schemes analyzing wavelengths. In a binary recording or communication system, the binary signal is limited to two distinct states for representing 1's or 0's. Such a representation is called "nonreturn to zero" (NRZ). An improved data representation scheme is so-called "NRZI (nonreturn to zero, change on 1 and no change on 0). Other data manifestations using multidistinct state signals include phase-encoded (PE), double-frequency (DFE or FM), etc.

As data rates increase, there is a corresponding increase in the frequency components of the signal being detected, as well as a substantial decrease in the time a data detector has to reliably extract represented data signals from an incoming or received signal. As such data bit period decreases in duration, the detection period for such data also decreases; hence, for a given squelch or recovery time in an integration system, the percentage of the detection period used for squelching increases. Accordingly, it is highly desirable to use alternate cycle integration as set forth in the above-referenced co-pending application. However, at higher frequencies, circuit parameters become more critical. Accordingly, the present invention includes a simple, but effective, circuit for rapid integration and squelch.

Another application of alternately cycled integration is phase error detection, or phase shift measurement. For accurate phase measurement at high frequencies of operation, a phase shift measuring circuit should respond to an input signal in the same manner as electrical integrators. Accordingly, the present invention employs the alternately cycled squelch reference as a source for phase shift measurement reference signals.

SUMMARY OF THE INVENTION

It is an object of the present invention to provide an improved data detection apparatus. An ancillary object is to provide the improved integration apparatus with a phase shift measuring circuit which is relatively insensitive to variations in threshold magnitudes.

In accordance with the present invention, a signal processing apparatus constructed in accordance with the invention, includes first and second electrical signal storage capacitors having a common terminal at a reference potential. Each capacitor has a signal terminal. First and second current source transistors have base electrodes commonly connected through a resistor to a squelch reference source. Their collector electrodes are also connected to the same squelch reference source. Emitter electrodes of these transistors are ohmically connected to the signal terminals of the storage capacitors. Further, the first and second sink transistor elements have their collector electrodes ohmically connected to the first and second signal terminals with commonly ohmically connected emitter electrodes which, in turn, are connected to a current sink. Data inputs to be integrated are supplied to the base electrodes of the sink transistor elements. The current source is switched on and off by a clock for synchronously integrating the data signals of the two capacitors. Squelch circuits can be completed by having an additional first and second squelch or current sink transistor connected in parallel with the first-mentioned current sink transistor elements. All of the squelch transistors are actuated in synchronism during the period of time when the current sink is current nonconductive.

In another aspect of the invention, the squelch reference connected to the current source transistor collector electrodes is also connected to another current source transistor for establishing a threshold for measuring phase shift of the signals being integrated. Timing signals applied to the integrator also time a phase shift measuring circuit such that the phase shift measurement is made in synchronism with the integration. The two integrator capacitors are then differentially compared with the squelch controlled threshold to indicate the magnitude of phase shift. When both integration capacitors have an integration amplitude below the above-indicated threshold, a first phase shift is indicated. In the illustrated embodiment, this first phase shift is arbitrarily defined as a phase error. When a certain integration differential threshold is exceeded, a second or lesser phase shift is indicated. In the illustrated embodiment, the second phase shift (which may be zero) indicates no phase error. Such phase shifts can also indicate other information, such as data. By providing additional thresholds, the concept is easily extendible for having three, four, five, and six thresholds for detecting and indicating various phase shifts. Phase shift polarity can also be detected and indicated.

The foregoing and other objects, features, and advantages of the invention will become apparent from the following more particular description of the preferred embodiment, as illustrated in the accompanying drawing.

THE DRAWING

DETAILED DESCRIPTION

Referring now more particularly to the appended drawing, like numerals indicate like parts and structural features in the various diagrams.

Figure 1:
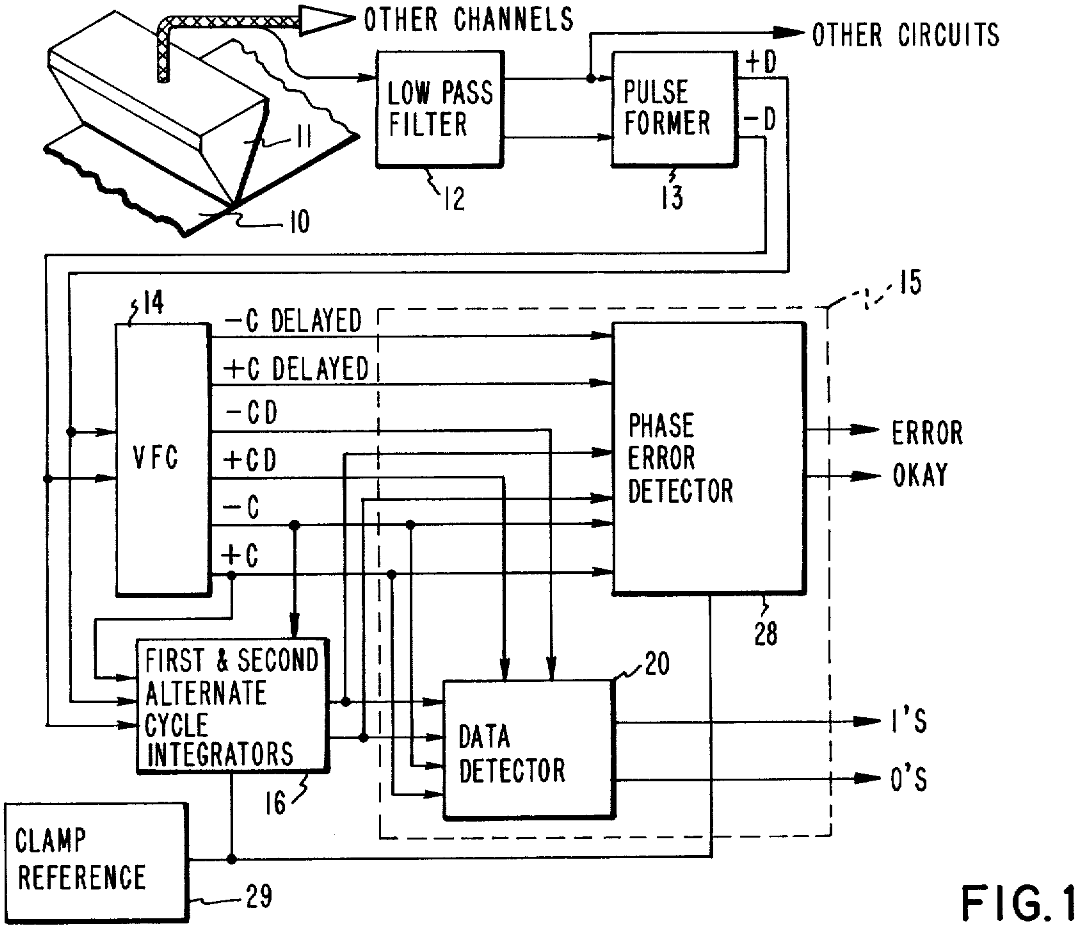
FIG. 1 is a simplified block diagram of an apparatus employing the present invention.

The present invention is particularly advantageously employed in the readback of digital signals from a magnetic medium 10 for supplying detected data signals to synchronously operated circuits, as is well known in the recording arts. A magnetic head 11 scans tracks on medium 10 to supply readback signals to low-pass filter 12, as well as other circuits or channels (not shown). In a multitrack environment, such as operation with a ½ inch magnetic tape medium, there can be nine circuits as shown in FIG. 1, one for each of the record tracks.

Figure 3:
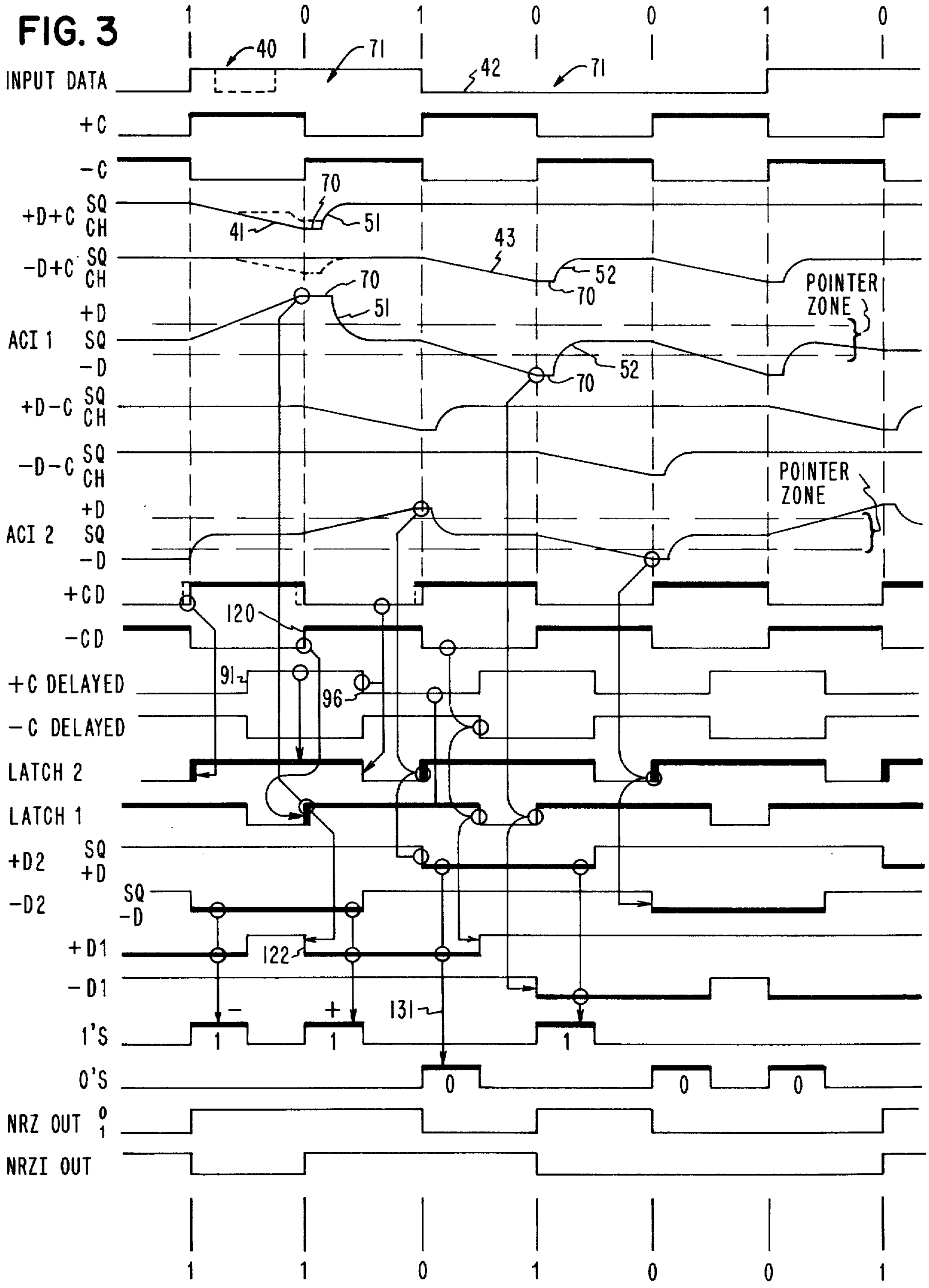
FIG. 3 is a set of signal waveforms used to illustrate the operation of the FIGS. 1 and 2 illustrated apparatus, both for data detection and phase error detection.

Low-pass filter 12 accentuates the low-frequency portion of the readback signal for enhancing data detection. In one constructed embodiment with which the present invention was employed, the bandpass of the readback signals was desired to be 3:1. Hence, the low-pass filter was designed to pass such a band from the baseband recorded signals on medium 10. The low-pass filter 12 also includes a phase splitter such that the readback signals are supplied in differential form to pulse former 13. The pulse former, in turn, differentially supplies amplitude limited input data signals hereinafter termed "+D and −D" signals. Such +D input data signals are shown in FIG. 3 as input data in the NRZI information representation. The −D signals have opposite polarity to the +D signals.

Pulse former 13 supplies the +D and −D amplitude limited data signals to synchronize VFC (variable frequency clock) 14, such as well known in the art. VFC 14 differentially supplies +C and −C timing or clock signals for enabling synchronous demodulation of the +D and −D data signals for supplying timed and detected signals from data output circuit 15.

The +D and −D amplitude limited data signals are supplied to both first and second alternately cycled integrators (ACI) 16. These two integrators are synchronous demodulators alternately and successively actuated to detect data signals, respectively, by the +C and −C timing signals. The first integrator operates during a first set of detection periods represented in FIG. 3 by +C signal position portions, while the second integrator operates on the input data signal during alternate successive periods identified by the positive portions of the −C clock signal. Such detection periods do not necessarily coincide with bit periods. In the illustrated input data signal, a bit period is between the carets intermediate the indicated data; while the detection periods are between bit period centers or cell centers on the record medium. The advantage of employing the present invention using detection periods shifted by 180° from the bit period will become apparent.

Each synchronous demodulator supplies, respectively, +D+C, −D+C, and −D−C, +D−C integrated signals to data detector 20 and phase error detector 28. Circuits 20, 28, respectively, compare under timing control of VFC 14, the integrated signals to indicate the integrated values, respectively, as data output signals and phase shift indicating signals. Again, signals from VFC 14 time the operation of these circuits 20 and 28 such that the output signals of these circuits respectively represent and phase shift detected data with the VFC timing information.

Data detector circuit 20 includes a compare latch for data detection, as fully described in the above-refered-to co-pending commonly assigned patent application. The present invention is not concerned with such a described detector, hence, is not further described for that reason. Such a detector latch is also described by Gene Clapper in the IBM TECHNICAL DISCLOSURE BULLETIN, February 1964, at Page 69.

In accordance with one aspect of the present invention, clamp reference 29 supplies reference signal voltage to both circuits 16 and 28 for ensuring reference thresholds are the same. With short detection periods, such thresholds are critical; hence, slaving the phase shift reference threshold to the integrator squelch reference threshold ensures consistent operation.

Figure 2:
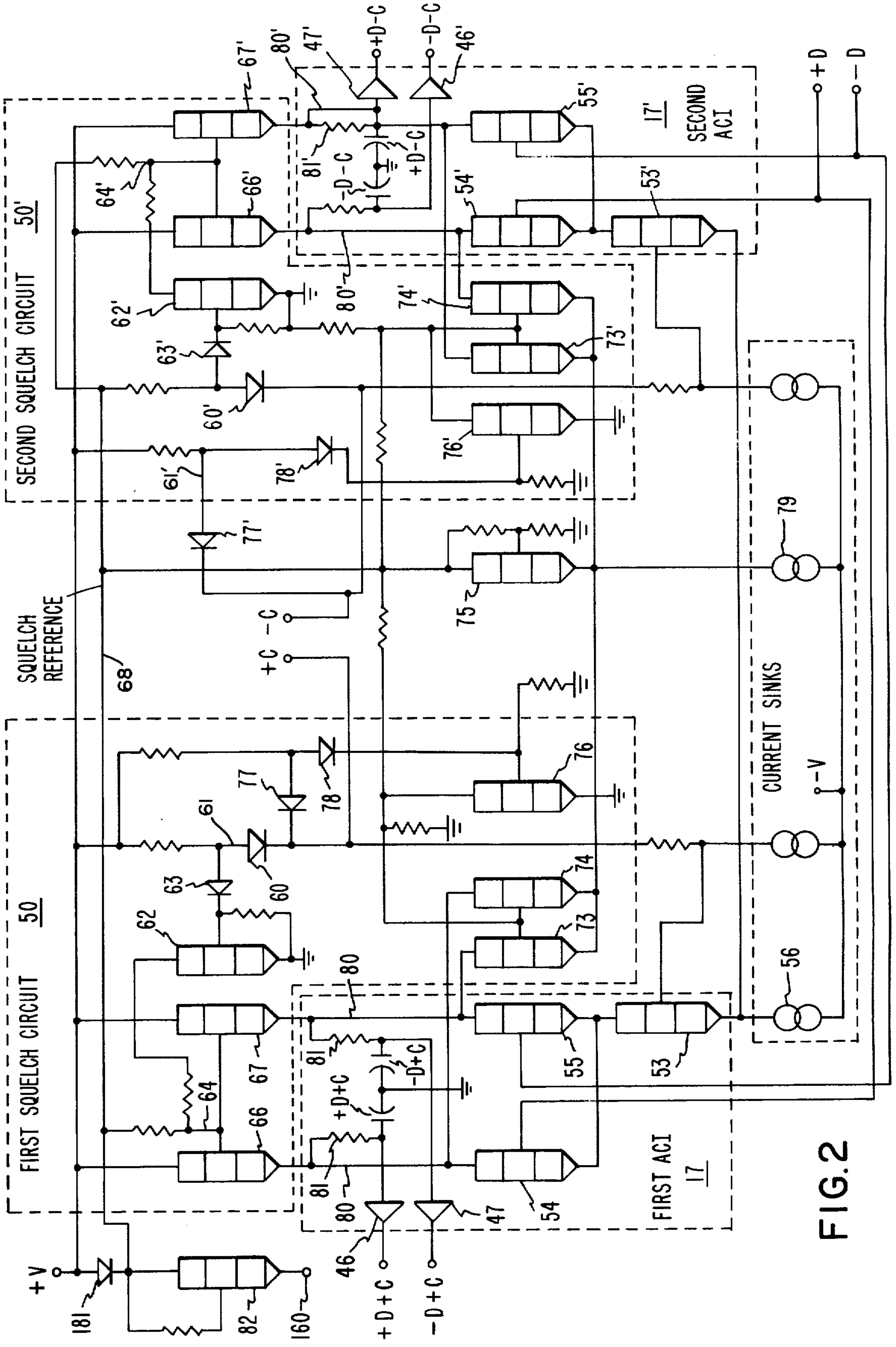
FIG. 2 is a circuit diagram showing the alternate cycle integrators used in the FIG. 1 illustrated embodiment and particularly illustrating squelch delay aspects of the present invention.

Referring next to FIG. 2, operation of the ACI's and squelch cicuits is described in detail with further reference to FIG. 3. The first and second ACI's are identically constructed, as are the squelch circuits. In the description, the number primed applies to the second ACI 17 and squelch circuit in the same manner as described for the first ACI 17 and squelch circuit. The first ACI 17 has two integration capacitors respectively labeled +D+C and −D+C. The +D+C capacitor integrates plus data during +clock times. Referring to FIG. 3, +clock when positive and when the +D input data is positive as at 40 causes the +D+C capacitor to be negatively charged as at 41. When +C is positive and −D is positive, the −D+C capacitor is similarly negatively charged. When +D is negative, as at 42, and charged as at 43, the differential integrated value of the first ACI taken between integration signal terminals 44 and 45 is shown in the signal waveform labeled ACI 1. Second ACI 17' operates in a similar manner for +D−C and −D−C capacitors. The integrated values in the respective capacitors are supplied through isolating amplifiers 46 and 47 to data detector circuit 20 and phase shift circuit 28.

First squelch circuit 50 squelches the capacitors in first ACI 17 in those bit periods when the second ACI 17' is integrating signals. For example, in the +D+C signal waveform, the squelch is at 51 for the integrated value 41. In a similar manner, squelch at 52 squelches −D+C capacitor as integrated at 43. Squelch waveforms are also shown in the ACI 1 signal. The ACI 2 signal shows operation of ACI 17'.

The first ACI 17 integrates data negatively whenever +C is positive. +C going positive disables squelch circuit 50. When +C is positive, current selector switch transistor element 53 connects the integrating transistors 54 and 55 to current source 56. When +C is negative, element 53 is current nonconductive to disconnect the ACI from source 56. During alternate cycles, the −C clock enables transistor element 53' of the second ACI such that current source 56 supplies integrating current for both ACI's in an alternate successive manner.

Transistor element 54 switches to current conduction by +D being positive. Transistor element 55 switches to current conduction in response to −D being positive, the latter corresponding to +D being negative. Hence, current source 56 supplies the integration current for both capacitors +D+C and −D+C in accordance with the synchronous relationship between the data signal and the VFC 14 supplied clock signal +C.

As +C goes negative, the squelch circuit 50, after a short squelch delay of this invention, rapidly returns the negatively charged value of +D+C and −D+C capacitors to a positive squelch reference potential as indicated by lines 51 and 52 of FIG. 3. When +C goes negative, transistor 53 becomes current nonconductive; hence, transistors 54 and 55 become inactive to hold the charge on the capacitors in the first ACI. +C being negative causes diode 60 to conduct current, thereby making node 61 relatively negative. This makes delay transistor 62 current nonconductive; that is, the circuit arrangement surrounding transistor element 62 delays the squelching or capacitors +D+C and −D+C by its saturation time. When +C was positive, node 61 correspondingly was positive. Thence, the positive voltage being fed through diode 63 makes transistor 62 current conductive to saturation. Such current conduction makes node 64 relatively negative, making the two matched current source squelch transistors 66 and 67 current nonconductive, hence, isolating squelch reference at node 68 from the two integration capacitors.

The term "matched transistor elements," as used in this specification, means that the electrical characteristics of such elements are almost identical. This is most advantageously achieved by simultaneously diffusing impurities for the transistor elements in the same area on a monolithic semiconductive chip such that the diffusions and the characteristics of the chip are as close as possible together. The entire FIG. 2 illustrated circuit can be achieved on one semiconductive chip, except for the capacitors, with matched transistors being located close together for achieving matching electrical characteristics.

Returning now to the operation of squelch circuit 50, transistor 62 being in current saturation cannot completely turn off until a predetermined time after +C has gone negative. The minority carriers in transistor element 62 continue to make node 64 relatively negative for a period of time equal to 5–15 nanoseconds. During this period of time, transistors 54 and 55 have switched off, resulting in a held voltage in ACI 1 signal as at 70. This squelch delay extends into the squelch period as at 71 following each detection period 40 and 42, for example. This action enables the ACI to be sampled without being affected by the squelch circuit 50. The above-described circuit uses high-speed current switches in an advantageous "H" arrangement to provide an optimum alternately cycled integration arrangement.

The current sink portion of squelch circuit 50 includes current switch transistor elements 73, 74, 75, and 73' and 74'. Transistor element 76 controls the current conduction of elements 73 and 74 in the same manner that transistor 62 controls elements 66 and 67. Also, transistor 76 is switched into and out of operation by diodes 77 and 78 in the same manner as diodes 60 and 63 control transistor 62. Transistor 76, during the integration (detection) period, is in current saturation and, therefore, affords the same delay as transistor 62. Thence, during the squelch time, transistors 73 and 74 respectively connect the capacitor nodes 80 to current sink 79 for supplying sufficient current for squelch level matching by transistors 66 and 67. Transistor 75 supplies current to sink 79 only when all transistor elements 73, 74, 73', and 74' are current nonconductive, i.e., during each and every squelch delay. Hence, transistor elements 73 and 74, plus 75 and 73', 74' constitute a three-way current switch for switching sink 79 between two circuits having delayed current switching (squelch) delays.

The positive squelch reference potential is determined by transistors 66 and 67 via common diode 181 connected to the collector source potential +V. The squelch reference on node 68 is applied to both ACI's 17 and 17'. In addition, diode-connected transistor 82 supplies the squelch reference potential to the phase error circuit as a phase error reference, as will be more fully described later.

VFC 14 supplies several timing signals. ±C signals time the ACI's 17, 17' and ±CD and ±C delayed time the data detector; while ±C delayed time phase shift measuring circuit 28. A +2C signal has double the pulse repetitive frequency of the +C clock and is slightly delayed for strobing the signal comparison state of circuit 28.

Squelch circuit 50 squelches integration capacitors +D+C and −D+C in a capacitive emitterfollower circuit configuration. To damp any oscillations, each capacitor has its signal terminal connected to the corresponding squelch-integrate nodes 80 via a damping resistor 81. The integrated signals in capacitors +D+C and −D+C are sensed by high-input impedance amplifiers or level shifters 46 and 47.

Figure 4:
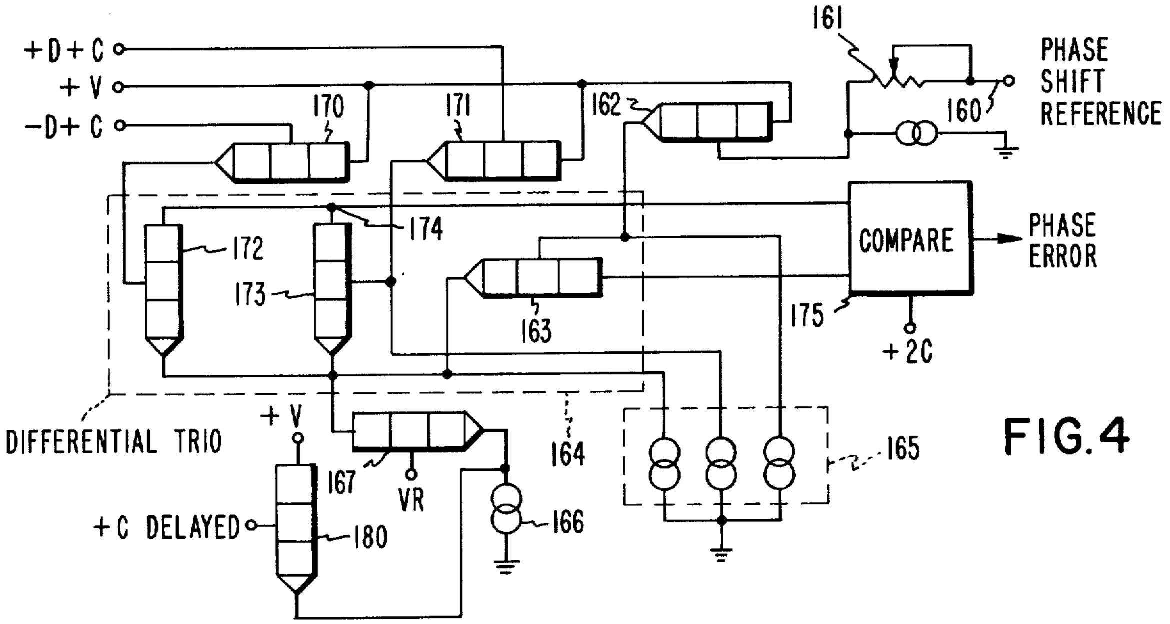
FIG. 4 is a circuit diagram of a phase error circuit particularly adapted to be used with the FIG. 2 illustrated circuit.

Referring next to FIG. 4, phase error circuit 28 is described. Phase shift reference from the alternate cycle integrators of FIG. 2 is received at 160 from transistor 82. The phase error reference is adjustable by potentiometer 161 to provide a variable reference for phase error thresholds at the base electrode of transistor 162. Any variation in ACI squelch reference adjusts the phase shift measurement reference. Since the ACI outputs are differentially compared with the phase shift reference, any shift in ACI reference also shifts the phase shift reference in a substantially fully compensating manner. Current source 162A tracks current source 56 of FIG. 2 so that the phase shift (error) threshold remains constant with respect to the squelch reference on line 86 regardless of current source 56 variations. Hence, phase shift measurements are now not subject to power supply and temperature variations.

Transistor 162, in turn, is emitter-follower coupled to the base electrode of the reference comparing transistor element 163 of the differential trio transistors 164. Current sources 165, for the various portions of the phase error circuit, are preferably matched; i.e., constructed in the same portion of the monolithic chip. Differential trio transistor elements share a common current source 166 through current switching transistor 167. The two input transistors 170 and 171 receive signals from the integration capacitors as indicated. These input transistor elements are emitter coupled to current sources 165 to drive the base electrodes of the two transistor elements 172 and 173 of the differential trio. If both transistors 172 and 173 have a total current summation, as summed at the common collector connection 174, which is greater than the reference current flowing through transistor 163, then compare circuit 175 supplies a phase error indicating signal. Note that if only one transistor 173 is highly current conductive, then the current magnitude to 163 is less; hence, no phase error. However, if both transistors 172 and 173 are current nonconductive, the current flow at 174 is small. Current source 162A tracks source 56 of FIG. 2 so that the phase shift (error) threshold remains constant with respect to the squelch reference on line 86, regardless of expected current source 56 variations. Such tracking is achieved simply by using identical circuit configurations for both current sinks 56 and 162A. Environmental changes, such as temperature and supply voltage variations, result in changed current sink amplitudes; such effects are minimized by such tracking.

Hence, the current through 163 will be greater, indicating the phase error. Compare circuit 175 is degated by the 2C signal such that the phase compare will occur only at each strobe time immediately following each detection period. Operation of the switching transistors 167 and 180 is as previously described. Circuit 28 responds to a phase error or noise as indicated by the dashed lines adjacent integration 41 (+D+C) and ACI 1 of FIG. 3. If ACI 1 amplitude is less than the pointer zone dashed line indicated amplitudes, circuit 28 indicates a phase error. Similar operation is taught by M. R. Cannon in the IBM TECHNICAL DISCLOSURE BULLETIN, September 1971, at Page 1171.

Circuit 28 phase shift output signal can indicate data carried by the input signal by phase shift modulation. Plural thresholds can be provided to supply output data signals from a multi-angle phase shifted input signal. For example, phase shift within the indicated zone can be one binary) value; while lesser phase shift (integration greater than threshold) is a second binary value. Phase shift polarity and direction is detected by two separate phase shift circuits 28, one for each of +D+C, +D−C, −D+C, and −D−C signals.

While the invention has been particularly shown and described with reference to a preferred embodiment thereof, it will be understood by those skilled in the art that various changes in form and detail may be made therein without departing from the spirit and scope of the invention.

What is claimed is:

1. Signal processing apparatus, including in combination:

first and second electrical signal storage capacitors having a common terminal at a reference potential and each having a signal terminal;

first and second current source transistor elements having commonly connected base electrodes and commonly connected collector electrodes for connection to a power signal source, said first and second current source transistor elements having emitter electrodes respectively ohmically connected to said signal terminals of said first and second signal storage capacitors;

first and second current sink transistor elements having collector electrodes respectively ohmically connected to said first and second signal terminals, commonly ohmically connected emitter electrodes, and electrically independent base electrodes;

means for receiving input signals having a given periodicity to be processed and supplying such received signals to said independent base electrodes;

timing signal generator means responsive to said received signals to generate a timing signal indicative of said given periodicity;

first and second constant current sinks; and first switching means responsive to said periodicity indication to alternately and successively connect said first and second constant current sinks to said commonly connected emitter electrodes and to said emitter electrodes of said current source transistor elements, respectively.

2. Apparatus as set forth in claim 1 wherein said first and second current source transistor elements have matched electrical characteristics;

squelch reference means connected to said commonly connected base electrodes; and an output circuit connected to said electrical signal storage capacitor signal terminals and having a circuit portion thereof electrically connected to said squelch reference means for processing signals received from said signal terminals in accordance with said squelch reference means.

3. Alternately cycled integration apparatus consisting of first and second signal processing apparatus set forth in claim 1, the improvement further including in combination:

first and second integration timing transistor elements in said first switching means having commonly connected emitter electrodes and collector electrodes respectively connected to said commonly connected emitter electrodes of said first and second current sink transistor elements, respectively, in said first and second signal processing apparatus;

said first current sink connected to said commonly connected emitter electrodes of said integration timing transistor elements;

said timing signal generator means supplying + and − timing signals as said periodicity indication;

a base electrode in each said integration timing transistor element respectively receiving said + and − timing signals to alternately and successively actuate said first and second signal processing apparatus to integrating operations; and squelch control means in said first switching means responsive to said + and − timing signals to alternately and successively actuate said first and second current source transistor elements, respectively, in said second and first signal processing apparatus such that when one of said signal processing apparatus is integrating another of said signal processing apparatus is being squelched.

4. Alternately cycled integration apparatus set forth in claim 3, wherein said squelch control means further includes a switching transistor element having an emitter electrode;

third reference means biasing said switching transistor element to a reference threshold for becoming current conductive;

first and second squelch sink transistor elements in each said signal processing apparatus with collector electrodes connected to said signal terminals in said signal processing apparatus, respectively, commonly connected base electrodes connected to said third reference means and each said squelch sink transistor elements having emitter electrodes connected to said emitter electrode of said switching transistor element; and first and second switching control elements interposed between said third reference means and said commonly connected base electrodes of said squelch sink transistor elements in said first and second signal processing apparatus and respectively responsive to said − and + timing signals to actuate same.

5. Alternately cycled integration apparatus set forth in claim 4 further including in combination:

a signal level translation means connected to said squelch reference means and having a level output terminal supplying a fourth reference signal related to said squelch reference signal; and a signal output circuit connected to said signal terminals and to said level output terminal to supply output signals indicative of integrated signals in said signal storage capacitors.

6. Alternately cycled integration apparatus set forth in claim 5 wherein said signal output circuit includes a timing transistor element responsive to said timing signal generator means to time operation of said signal output circuit with said periodicity indication; and another current sink in said signal output circuit exhibiting environmental variation characteristics similar to said second current sink.

7. Alternately cycled integration apparatus set forth in claim 6 wherein said signal output apparatus further includes:

a comparator circuit portion with a given comparison threshold having one input connected to a first given one of said signal terminals and a second input connected to said level output terminal; and said another current sink connected to said second input such that said given comparison threshold varies with said squelch reference signal.

8. Alternately cycled integration apparatus set forth in claim 7 wherein said comparator circuit has a third input connected to a second given one of said signal terminals, said first and second given one signal terminals being in one of said signal processing apparatus;

first, second, and third compare transistor elements having commonly connected emitter electrodes and base electrodes respectively connected to said first, second, and third inputs, collector electrodes in said first and third compare transistor elements being connected together, a collector electrode on said second compare transistor element; and a compare latch timed by said timing signal generator means and having first and second inputs respectively connected to collector electrodes of said first and second compare transistor elements and having an output terminal for carrying a signal indicating phase error when both said first and second compare transistor elements are current nonconductive at a time indicated by said timing signal generator means.

9. A signal processing circuit having first and second portions for repetitively serially processing input signals therethrough, said first portion processing signals then supplying first processed signals to said second portion for processing, the improvement including in combination:

first reference means in said first portion supplying a first reference signal for establishing a given quiescent signal state in said first portion when it is not processing signals; and second reference means in said second portion responsive to said first reference to establish an operational reference in said second portion for processing signals received from said first portion.

10. The circuit set forth in claim 9 wherein said first portion includes an integrator circuit receiving said input signals and said first processed signals being signals based upon integrating said input signals, and said quiescent signal state being a squelch state of said integrator circuit.

11. The circuit set forth in claim 9 wherein said second portion includes a signal comparator receiving said first processed signals and said second reference means supplies said operational reference to said signal comparator for adjusting its operation.

12. The circuit set forth in claim 11 wherein said signal comparator compares said first processed signals with said operational reference and supplies an output signal indicating a greater or less comparison.

13. The circuit set forth in claim 12 wherein said input signals have a given periodicity;

a clock in said first portion responsive to said input signal to supply a timing signal;

said integrator circuit and said signal comparator responsive to said timing signal to time an input signal integration followed by a signal compare and integrator squelch; and said reference signals having a substantially constant amplitude.

14. The circuit set forth in claim 13 wherein said first portion has first and second ones of said integrator circuits, said timing signal having first and second halves in repetitive cycles;

said integrator circuits respectively responsive to said first and second signal halves to alternately and successively integrate an input signal and squelch to said first reference signal such that said input signals are alternately and successively integrated on alternate ones of said integrator circuits;

one of said integrator circuits supplying its first processed signal to said signal comparator; and additional output means responsive to said integrator circuits to supply an output signal during each said timing signal half.

15. The circuit set forth in claim 14 wherein each said integrator circuit includes:

two signal integrating capacitors, each with an integrating end;

a two-part squelch circuit, a first squelch circuit part having two transistor elements with emitter portions ohmically connected to said integrating ends, respectively, base portions commonly connected to said first reference means for receiving said first reference signal, a second squelch circuit part having two transistor elements with collector portions respectively ohmically connected to said integrating ends, and means in said squelch circuit responsive to said timing signal to switch said transistor elements between current conduction and nonconduction.

16. The circuit set forth in claim 14 further including in combination:

first current sinks in each said integrator circuit;

a second current sink in said second reference means; and said current sinks exhibiting substantially similar current amplitude variations with respect to environmental changes.

17. The circuit set forth in claim 9 further including in combination:

a first current sink in said first portion and means in said first portion operative to utilize said first current sink for signal processing;

a second current sink in said second reference means and operative in connection with establishing said operational reference; and said current sinks exhibiting similar current amplitude-to-temperature variations.

18. The circuit set forth in claim 17 wherein said first portion includes an integrator circuit, means connecting said first current sink to said integrator circuit in accordance with said input signal;

and said second reference means transistor element having control and output portions, said control portion receiving said first reference signal and said second current sink being connected to said input portion.

19. A signal processing circuit having an integrator, the improvement including in combination:

means establishing a squelch reference signal for said integrator;

means to squelch said integrator to said squelch reference signal; and integrator output means having a threshold reference circuit receiving said squelch reference signal for establishing an output reference potential in said output means derived from said squelch reference signal and having a circuit portion responsive to said integrator and said output threshold reference to supply an output signal.

20. The method of processing a signal while employing signal integrating techniques, the improvement having the steps of:

repetitively squelching an integrator circuit to a reference potential;

intermediate said squelching, integrating an input signal in said integrator circuit by exchanging electrical current therewith at a given rate and in accordance with said input signal;

deriving a threshold signal from said reference potential; and just prior to each squelch, sampling said integrator circuit integrated signal and comparing the integrated signal amplitude with said threshold signal.

21. The method set forth in claim 20 further including the steps of:

establishing a current path and passing electrical current at a rate proportional to said given rate irrespective of temperature variations; and applying said reference potential to said current path and deriving said threshold signal from said reference potential via said current path.

22. The method of squelching a two-capacitor integrator circuit;

ohmically attaching matched transistor elements to said capacitors, respectively; and periodically applying a reference potential to said transistor elements while simultaneously connecting a current sink to both said capacitors for establishing identical constant current flows through both said transistor elements during a given squelch time for precisely establishing the same squelch potential on both said capacitors.

* * * * *